(12) United States Patent
Salter et al.

(10) Patent No.: US 10,576,879 B1
(45) Date of Patent: Mar. 3, 2020

(54) RETRACTABLE ILLUMINATED RUNNING BOARD

(71) Applicant: Ford Global Technologies, LLC, Dearborn, MI (US)

(72) Inventors: Stuart C. Salter, White Lake, MI (US); Mehran Niksimaee, Orchard Lake Village, MI (US); Daniel J. Martin, Plymouth, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/275,502

(22) Filed: Feb. 14, 2019

(51) Int. Cl.
| *B60Q 1/24* | (2006.01) |
| *B60Q 1/32* | (2006.01) |
| *B60Q 1/00* | (2006.01) |
| *F21S 43/239* | (2018.01) |
| *F21S 43/16* | (2018.01) |
| *F21V 23/04* | (2006.01) |
| *F21V 23/00* | (2015.01) |
| *B60R 3/00* | (2006.01) |
| *B60R 3/02* | (2006.01) |

(52) U.S. Cl.
CPC ........... *B60Q 1/323* (2013.01); *B60Q 1/0017* (2013.01); *F21S 43/16* (2018.01); *F21S 43/239* (2018.01); *F21V 23/003* (2013.01); *F21V 23/0471* (2013.01); *B60Q 2400/40* (2013.01); *B60R 3/002* (2013.01); *B60R 3/02* (2013.01)

(58) Field of Classification Search
CPC ......... B60Q 1/0011–0017; B60Q 1/323; F21S 43/13–251; F21V 23/003–009; F21V 23/0442–0471; B60R 3/002
USPC ........................................ 362/495, 510–511
See application file for complete search history.

(56) References Cited

U.S. PATENT DOCUMENTS

| 6,117,362 A | 9/2000 | Yen et al. |
| 6,953,536 B2 | 10/2005 | Yen et al. |
| 8,163,201 B2 | 4/2012 | Agrawal et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,519,359 B2 | 8/2013 | Kingsley et al. |
| 8,664,624 B2 | 3/2014 | Kingsley et al. |
| 8,952,341 B2 | 2/2015 | Kingsley et al. |
| 9,057,021 B2 | 6/2015 | Kingsley et al. |
| 9,487,127 B2 | 11/2016 | Salter et al. |
| 9,487,128 B2 | 11/2016 | Salter et al. |

(Continued)

*Primary Examiner* — Jason M Han
(74) *Attorney, Agent, or Firm* — David Coppiellie; Price Heneveld LLP

(57) ABSTRACT

An illumination system for a vehicle running board comprises at least one lighting module in connection with a step portion of the running board. The lighting module extends longitudinally along the running board proximate to at least one door of the vehicle. The lighting module comprises a first light source disposed in a first end portion of the lighting module and a second light source disposed in a second end portion of the lighting module. A waveguide forms an emission surface extending longitudinally along a side portion of the step portion. A controller is configured to activate the first light source illuminating the side portion in a first color and activate the second light source to illuminate the side portion in a second color.

5 Claims, 7 Drawing Sheets

(56) References Cited

U.S. PATENT DOCUMENTS

| | | | |
|---|---|---|---|
| 9,493,699 B2 | 11/2016 | Agrawal et al. | |
| 9,499,093 B1 | 11/2016 | Salter et al. | |
| 9,499,094 B1 | 11/2016 | Dellock et al. | |
| 9,539,937 B2 | 1/2017 | Dellock et al. | |
| 9,758,090 B1 * | 9/2017 | Salter | B60Q 1/323 |
| 9,963,066 B1 | 5/2018 | Salter et al. | |
| 10,150,419 B2 | 12/2018 | Derbis et al. | |
| 2012/0183677 A1 | 7/2012 | Agrawal et al. | |
| 2015/0175059 A1 | 6/2015 | Dellock et al. | |
| 2015/0197180 A1 | 7/2015 | Salter et al. | |
| 2016/0009220 A1 | 1/2016 | Salter et al. | |
| 2016/0347240 A1 | 12/2016 | Salter et al. | |
| 2017/0190282 A1 | 7/2017 | Salter et al. | |
| 2017/0282787 A1 | 10/2017 | Salter et al. | |
| 2017/0334358 A1 | 11/2017 | Dellock et al. | |
| 2018/0009384 A1 | 1/2018 | Dellock et al. | |
| 2018/0170266 A1 | 6/2018 | Dellock et al. | |
| 2018/0345868 A1 | 12/2018 | Dellock et al. | |
| 2019/0009711 A1 | 1/2019 | Salter et al. | |

* cited by examiner

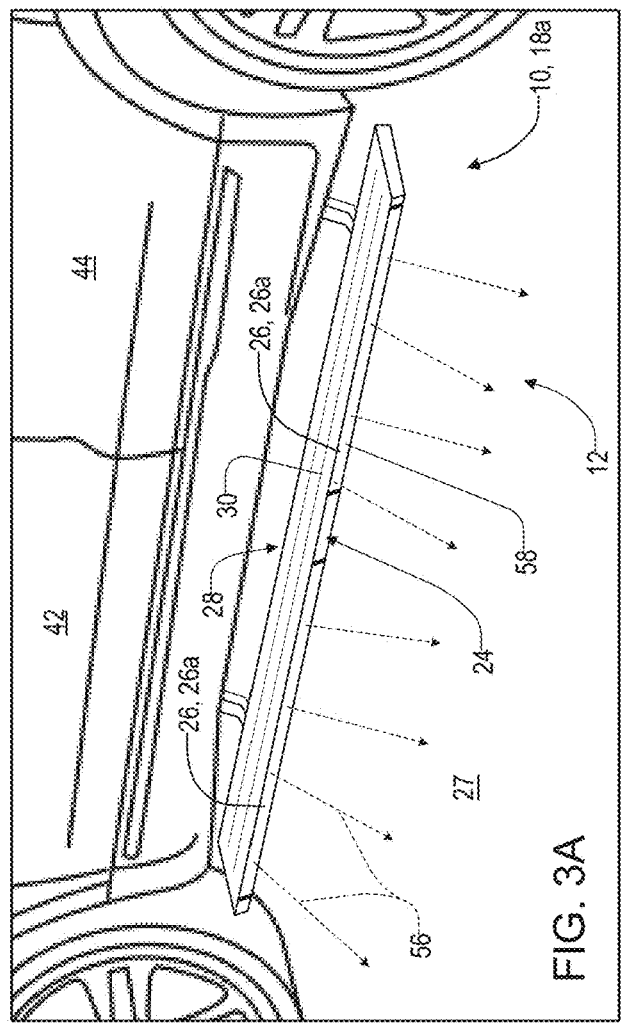
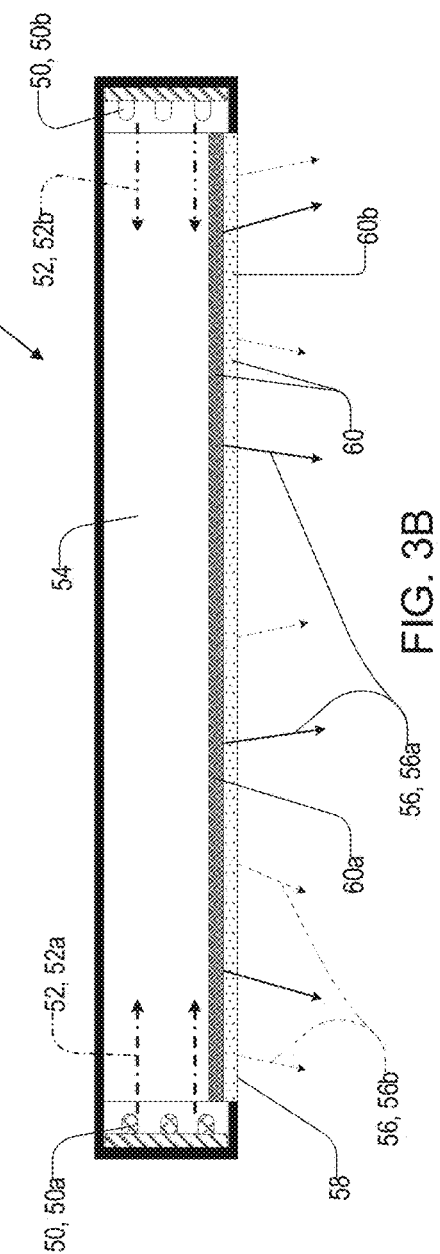
FIG. 3A
FIG. 3B

RETRACTABLE ILLUMINATED RUNNING BOARD

FIELD OF THE DISCLOSURE

The present disclosure generally relates to an illumination apparatus for a vehicle and, more particularly, relates to an illumination apparatus configured to illuminate an entry region of a vehicle.

BACKGROUND OF THE DISCLOSURE

Illumination arising from the use of photoluminescent structures offers a unique and attractive viewing experience. It is, therefore, desired to implement such structures in automotive vehicles for various lighting applications.

SUMMARY OF THE DISCLOSURE

According to one aspect of the present disclosure, an illumination system for a vehicle running board is disclosed. The system comprises at least one lighting module in connection with a step portion of the running board. The lighting module extends longitudinally along the running board proximate to at least one door of the vehicle. The lighting module comprises a first light source disposed in a first end portion of the lighting module and a second light source disposed in a second end portion of the lighting module. A waveguide forms an emission surface extending longitudinally along a side portion of the step portion. A controller is configured to activate the first light source illuminating the side portion in a first color and activate the second light source to illuminate the side portion in a second color.

Embodiments of the first aspect of the disclosure can include any one or a combination of the following features:
  the controller is further configured to activate the first light source from the first end portion in combination with the second light source from the second end portion to illuminate the side portion in a third color;
  a first photoluminescent material disposed in at least one layer disposed over the emission surface;
  the first photoluminescent material is configured to generate the first output emission in an amber color in response to receiving the second excitation emission in a wavelength ranging from approximately 360 nm-380 nm;
  wherein the first light source is configured to emit a first excitation emission, the first excitation emission is configured to react with the first photoluminescent material to generate a first output emission in the first color;
  the first photoluminescent material is a persistent luminescent material configured to retain a charge in response to receiving the first excitation emission;
  the persistent luminescent material is configured to retain a charge for a period of at least five minutes following the deactivation of the first excitation emission from the first light source;
  a second photoluminescent material is disposed in the at least one layer disposed over the emission surface;
  the second photoluminescent material is configured to generate the second output emission in a blue-white color in response to receiving the second excitation emission in a wavelength ranging from approximately 460 nm-480 nm;
  the second light source is configured to emit a second excitation emission configured to react with the second photoluminescent material to generate a second output emission in the second color;
  each of the first photoluminescent material and the second photoluminescent material is independently stimulated to emit the first output emission in response to the first excitation emission and the second output emission in response to the second excitation emission;
  the second photoluminescent material is a transient luminescent material configured to illuminate during a temporal period significantly coinciding with the receipt of the second excitation emission;
  the transient luminescent material is configured to illuminate for a period of less than five seconds following the deactivation of the second excitation emission from the second light source;
  the at least one lighting module comprises a plurality of lighting modules and the at least one door comprises a plurality of doors, wherein the plurality of lighting modules are positioned in the running board below a corresponding one of the plurality of doors;
  the controller is further configured to illuminate each of the lighting modules to indicate a selected door of the plurality of doors, wherein the selected door corresponds to a location in the passenger compartment available for occupancy; and/or
  the controller is further in communication with at least one occupancy sensor, and wherein the controller is configured to identify the location in the passenger compartment available for occupancy in response to information communicated from the occupancy sensor.

According to another aspect of the present disclosure, a method for illuminating a running board of a vehicle is disclosed. The method comprises emitting a first excitation emission from a first side of at least one lighting module through a waveguide extending longitudinally along the running board and outputting a first output emission from an emitting surface of the lighting module in a first color. The method further comprises emitting a second excitation emission from a second side of the at least one lighting module through the waveguide and outputting a second output emission from the emitting surface in a second color.

According to yet another aspect of the present disclosure, a lighting apparatus of a running board for a vehicle is disclosed. The lighting apparatus comprises at least one lighting module in connection with a step portion of the running board. The lighting module comprises a first light source disposed in a first end portion of the lighting module and a second light source disposed in a second end portion of the lighting module. A waveguide forms an emission surface extending longitudinally along the side portion of the step portion. A first photoluminescent material is disposed in at least one layer disposed over the emission surface. The first photoluminescent material is a persistent luminescent material configured to retain a charge in response to receiving the first excitation emission. A second photoluminescent material is disposed in the at least one layer disposed over the emission surface. The second photoluminescent material is a transient luminescent material configured to illuminate during a temporal period significantly coinciding with the receipt of the second excitation emission. A controller is configured to selectively activate the first light source illuminating the side portion in a first color, and selectively activate the second light source to illuminate the side portion in a second color.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3A is a projected view of the running board demonstrating a lighting apparatus;

FIG. 3B is a schematic view of the lighting apparatus demonstrated in FIG. 3A;

DETAILED DESCRIPTION OF THE PREFERRED EMBODIMENTS

Figure 1:
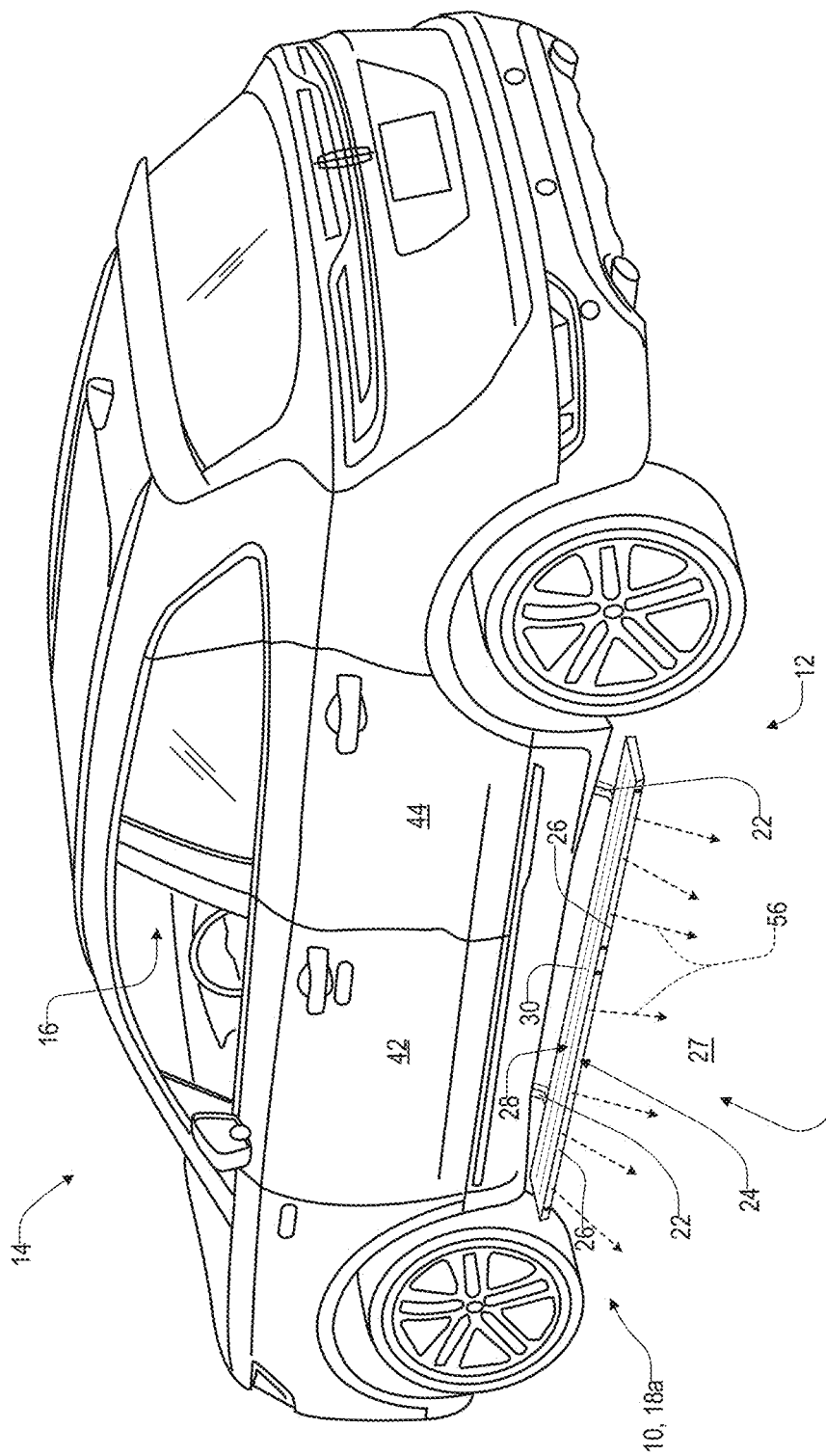
FIG. 1 is a projected view of a vehicle having a retractable illuminated running board.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

It will be understood that any described processes or steps within described processes may be combined with other disclosed processes or steps to form structures within the scope of the present disclosure. The exemplary structures and processes disclosed herein are for illustrative purposes and are not to be construed as limiting.

Referring now to FIGS. 1-5, the disclosure is related to a running board apparatus 10 comprising a lighting apparatus 12 for a vehicle 14. As discussed herein, the running board apparatus 10 may be implemented on vehicles having an elevated ride height, such as trucks and sport utility vehicles. In such examples, the running board apparatus 10 may provide for improved ease of access for occupants entering and exiting a passenger compartment 16 of the vehicle 14. In some examples provided herein, the operation of the running board apparatus 10 may be configured to respond to the detection of one or more passengers or operators approaching the vehicle 14. Occupants, passengers, and operators may generally be referred to as passengers of the vehicle 14 for clarity hereinafter.

As further discussed in reference to FIGS. 3A, 3B, and 3C; the running board apparatus 10 may be configured to extend to a deployed configuration 18a (illustrated in FIGS. 1, 3B, 3C) from a retracted configuration 18b (illustrated in FIG. 3B) in response to the detection of an approaching passenger. A further detailed description of an exemplary motor and linkage system for the running board apparatus is described in U.S. Pat. No. 10,150,419; which is incorporated herein by reference in its entirety. When implemented in combination, the running board apparatus 10 and the lighting apparatus 12 may form a passenger access system 20, which may be configured to provide convenient access to the passenger compartment 16 and provide various beneficial lighting operations throughout passenger access and operation of the vehicle 14. As provided in the following description, the disclosure may provide for improved operation of the vehicle 14 based on one or more beneficial configurations of the running board apparatus 10 and/or the associated lighting apparatus 12.

Referring now to FIG. 1, the vehicle 14 is generally shown comprising the running board apparatus 10 extending along the side of the vehicle 14. In the exemplary embodiments shown, the running board apparatus 10 comprises a plurality of mounting brackets 22 secured to the vehicle 14. The mounting brackets 22 may be moveable (e.g. via a motor and/or a passenger) between the deployed configuration 18a and the retracted configuration 18b. As shown, the running board apparatus 10 comprises a side portion 24 that may extend substantially coextensive to a length of the running board apparatus 10. The side portion 24 may comprise one or more lighting modules 26 of the lighting apparatus 12. In this configuration, a controller of the system 20 and/or the lighting apparatus 12 may be configured to selectively activate the one or more lighting modules 26 to emit light from the side portion 24 thereby illuminating a ground surface 27 proximate to the running board apparatus and/or a deck 28 or step portion of the running board apparatus.

Figure 2:
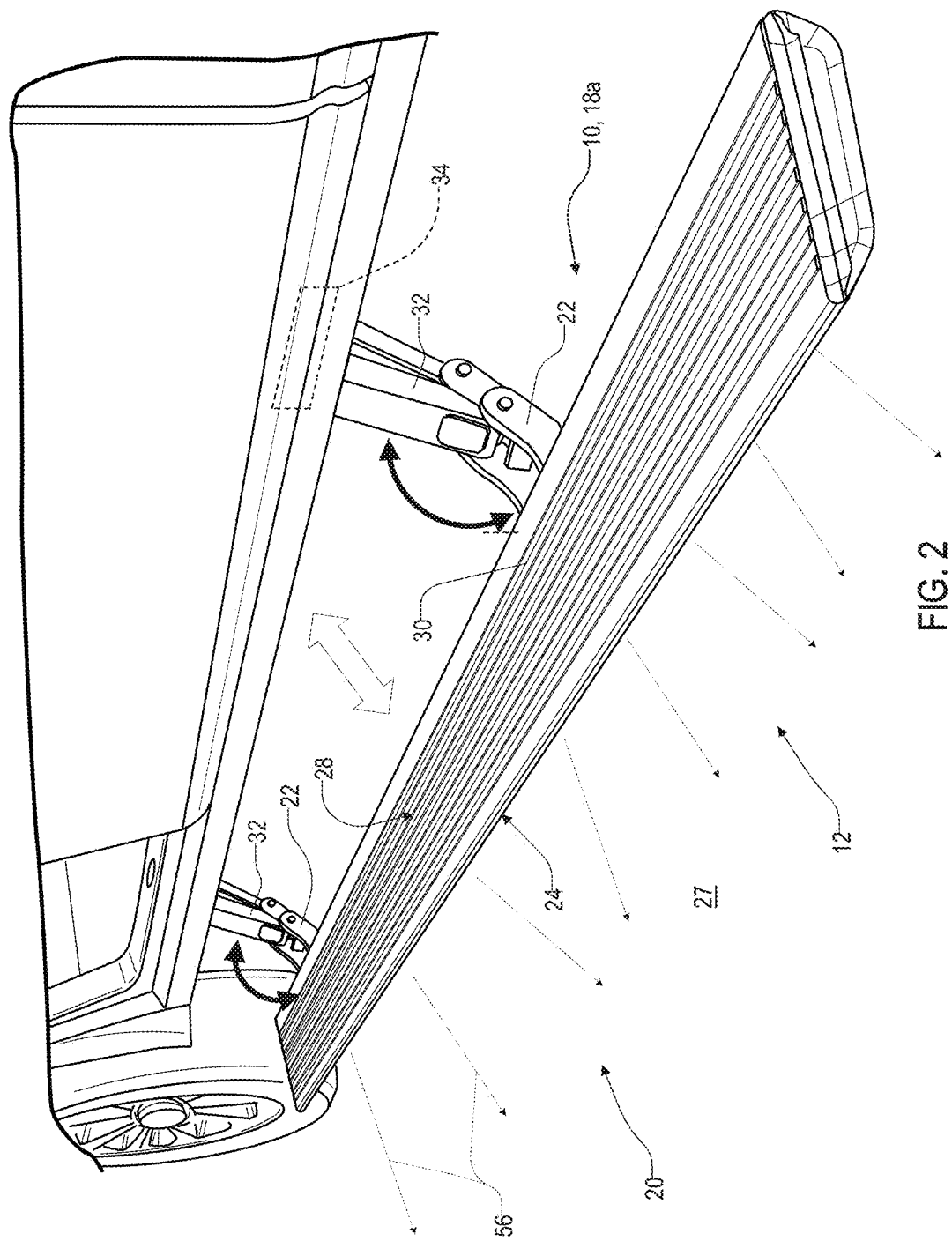
FIG. 2 is a projected view of the running board in a deployed position.

Referring to FIG. 2, the running board apparatus 10 or running board apparatus 10 may comprise a tread 30 extending over the deck 28. The deck 28 is in connection with the mounting brackets 22, which may correspond to retracting mechanisms. The mounting brackets 22 are each mounted to the vehicle underbody via a corresponding support bracket 32. A motor 34 may be operably coupled to each of the support brackets 32 and may be configured to control the deck 28 of the running board apparatus 10 to move between the retracted configuration 18b and the deployed configuration 18a. In this way, one or more controllers of the vehicle 14 and/or the system 20 may be configured to control the configurations 18a and 18b of the running board apparatus 10.

Referring now to FIGS. 1, 3A, and 3B, the lighting apparatus 12 may comprise a plurality of the lighting modules 26. As illustrated, the lighting modules 26 may comprise a first lighting module 26a positioned below and proximate to a first front entry door 42 and a second lighting module 26b positioned below and proximate to a first rear entry door 44. Though not shown, a third lighting module and fourth lighting module may be similarly implemented below and proximate to a second front entry door and a second rear entry door disposed on an opposite side of the vehicle than those pictured in FIG. 3B. In this configuration, a controller of the system 20 may be configured to selectively illuminate each of the lighting modules 26 independently to output a visual indication corresponding to each of the entry doors 42, 44. Further details of an exemplary controller of the system 20 are discussed in reference to FIG. 6.

Each of the lighting modules 26 may comprise a plurality of light sources 50. In some implementations, the light sources 50 may comprise a first light source 50a configured to output a first excitation emission 52a and a second light source 50b configured to output a second excitation emission 52a. The lighting module 26 may comprise a waveguide 54 extending longitudinally along the length of the running board apparatus 10 from the first light source 50a to the second light source 50b. The waveguide 54 may be of an optical fiber material configured to efficiently transmit the excitation emissions 52 along a length of each of the lighting modules 26. In this configuration, the excitation emissions 52 may be transmitted evenly along a length of the lighting modules 26 to illuminate the lighting modules 26 in output emissions 56 radiated from an exterior surface 58 forming the side portion 24 of the lighting modules 26.

The lighting modules 26 may comprise a first photoluminescent layer 60a and a second photoluminescent layer 60b. The first photoluminescent layer 60a may be of a persistent photoluminescent material configured to store a charge and illuminate in response to receiving the first excitation emission 52a. A first output emission 56a may be emitted from the first photoluminescent layer 60a for an extended period of time (e.g. greater than 5 minutes) following the cessation of the first excitation emission 52a. The continued illumination of the first photoluminescent layer 60a may be a result of the charge stored by the persistent luminescent material. The second photoluminescent layer 60b may be of a conventional photoluminescent material configured to illuminate in response to the second excitation emission 52b. A second output emission 56b may be emitted from the second photoluminescent layer 60b. The second output emission 56b may only be emitted from the second photoluminescent layer 60b during a temporal period significantly coinciding with the receipt of the second excitation emission 52b.

In various embodiments, the first output emission 56a may be in a first color and the second output emission 56b may be in a second color, different from the first color. The color of each of the output emissions 56 may be substantially a result of the materials utilized for the photoluminescent layers 60 as discussed herein. Accordingly, the materials utilized for the photoluminescent layers 60 may be selected to provide the color of the first output emission 56a, the second output emission 56b, and a third combined color of the output emissions 56 in combination. A specific example of a color of the first photoluminescent layer 60a and the second photoluminescent layer 60b is discussed in reference to FIG. 5.

The second photoluminescent layer 60b may differ from the first photoluminescent layer 60a by only emitting light for a short period of time (e.g. 200 ms) following the cessation of the receipt of the second excitation emission 52b. Accordingly, the first photoluminescent layer 60a may remain illuminated after the first excitation emission 52a is deactivated whereas the second photoluminescent layer 60b may cease to illuminate within only a few seconds or less following the deactivation of the second excitation emission 52b. Based on the sustained illumination of the first photoluminescent layer 60a and the limited or transient operation of the second photoluminescent layer 60b, each of the modules 26 of the lighting apparatus 12 may be controlled in a variety of beneficial ways to provide valuable illumination of the running board 10 while limiting power usage when the vehicle is not actively utilized in transport. Information regarding the construction of the photoluminescent layers 60 is disclosed in U.S. Pat. No. 8,232,533, the entire disclosure of which is incorporated herein by reference. For additional information regarding fabrication and utilization of photoluminescent materials to achieve various light emissions, refer to U.S. Pat. Nos. 8,207,511; 8,247,761; 8,519,359; 8,664,624; 9,057,021; and 9,493,699; and U.S. Patent Application Publication No. 2012/0183677, all of which are incorporated herein by reference in their entirety.

As previously discussed, the first photoluminescent layer 60a may comprise one or more materials configured to retain a charge and emit the first output emission 56a for an extended period of time following the deactivation of the first excitation emission 52a. In some embodiments, the first photoluminescent layer 60a may be formed of a long persistence photoluminescent material that emits the output emission 56a as converted light from the first excitation emission 52a. The long persistence photoluminescent material may be defined as having a long decay time due to its ability to store energy from the first excitation emission 52a and release the converted light as the first output emission 56a gradually, for a period of several minutes or hours, following the cessation of the excitation emission 52a.

The long persistence photoluminescent material of the first photoluminescent layer 60a, according to one embodiment, may be operable to emit light at or above an intensity of 0.32 mcd/m2 after a period of ten (10) minutes. Additionally, the long persistence photoluminescent material may be operable to emit light above or at an intensity of 0.32 mcd/m2 after a period of thirty (30) minutes and, in some embodiments, for a period substantially longer than sixty (60) minutes (e.g., the period may extend twenty-four (24) hours or longer, and in some instances, the period may extend forty-eight (48) hours). Accordingly, the long persistence photoluminescent material may continually illuminate in response to first excitation emission 52a from the first light source 50a or any light sources with wavelengths configured to excite the first photoluminescent layer 60a.

In some examples, the long persistence photoluminescent material of the first photoluminescent layer 60a may correspond to alkaline earth aluminates and silicates, for example doped di-silicates, or any other compound that is capable of emitting light for an extended period of time once the first excitation emission 52a is no longer emitted from the first light source 50a. The long persistence photoluminescent material may be doped with one or more ions, which may correspond to rare earth elements, for example, Eu2−, Tb3+ and/or Dy3. According to one non-limiting exemplary embodiment, the first photoluminescent layer 60a may comprise a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

Additional information regarding the production of long persistence photoluminescent materials is disclosed in U.S. Pat. No. 8,163,201 entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. Nos. 6,953,536; 6,117,362; and 8,952,341, all of which are incorporated herein by reference in their entirety.

The second photoluminescent layer 60b may be configured to output the second output emission 56b for a temporal period substantially coinciding with the receipt of the second excitation emission 52b. The photoluminescent material of the second photoluminescent layer 60b may include organic or inorganic fluorescent dyes including rylenes, xanthenes, porphyrins, phthalocyanines. Additionally, or alternatively, the photoluminescent material may include phosphors from the group of Ce-doped garnets such as YAG:Ce and may be a short persistence photoluminescent material. For example, an emission by Ce3+ is based on an electronic energy transition from 5d1 to 4f1 as a parity allowed transition. As a result of this, a difference in energy between the light absorption and the light emission by Ce3+ is small, and the luminescent level of Ce3+ has an ultra-short lifespan, or decay time, of 10-8 to 10-7 seconds (10 to 100 nanoseconds). The decay time may be defined as the time between the end of excitation from the second light source 50b and the moment when the light intensity of the second output emission 56b from the second photoluminescent layer 60b drops below a minimum visibility of 0.32 mcd/m2. A visibility of 0.32 mcd/m2 is roughly 100 times the sensitivity of the dark-adapted human eye, which corresponds to a base level of illumination commonly used by persons of ordinary skill in the art.

In some examples, the second photoluminescent layer 60b may comprise a Ce3+ garnet, which has a peak excitation spectrum that may reside in a shorter wavelength range than that of conventional YAG:Ce-type phosphors. Accordingly, Ce3+ has short persistence characteristics such that its decay time may be 100 milliseconds or less. Therefore, in some embodiments, the rare earth aluminum garnet type Ce phosphor may serve as the photoluminescent material with ultra-short persistence characteristics, which can emit the second output emission 56b by absorbing purple to blue light for the second excitation emission 52b from the second light source 50b. According to one embodiment, a ZnS:Ag phosphor may be used to create a blue light for the second output emission 56b. A ZnS:Cu phosphor may be utilized to create a yellowish-green light for the second output emission 56b. A Y2O2S:Eu phosphor may be used to create red light for the second output emission 56b. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201, the entire disclosure of which is incorporated herein by reference.

The first photoluminescent layer 60a and the second photoluminescent layer 60b may be configured to be activated independently by the first excitation emission 52a and the second excitation emission 52b. For example, the lighting module 26 may be configured to control the first excitation emission 52a from the first light source 50a to illuminate a first photoluminescent layer 60a in the first output emission 56a. The lighting module 26 may also be configured to control the second excitation emission 52b from the second light source 50b to illuminate the second photoluminescent layer 60b in the second output emission 56b. In this configuration, the lighting apparatus 12 may be operable to independently activate the first output emission 56a and the second output emission 56b.

Additionally, in some implementations, the lighting apparatus 12 may be configured to shift or adjust a color of a combined output emission comprising the combination of the first output emission 56a and the second output emission 56b by simultaneously activating the first light source 50a and the second light source 50b. Similarly, the controller of the lighting apparatus 12 may be configured to control the combined output emission comprising the combination of the first output emission 56a and the second output emission 56b by activating the second light source 50b while the first output emission 56a is output from the first photoluminescent layer 60a as a result of a previous charge. In this way, the controller may control the lighting apparatus 12 to output a combination of the first output emission 56a and the second output emission 56b while only activating the second excitation emission 52b to drive the second output emission 56b and relying on the long persistence photoluminescent material to output the first output emission 56a.

In order to provide for the independent activation of the output emissions 56, each of the photoluminescent layers 60 of the lighting module 26 may have different absorption ranges. For example, the first photoluminescent layer 60a may have a first absorption range configured to become excited in response to receiving the first excitation emission 52a. In response to receiving the first excitation emission 52a, the first photoluminescent layer 60a may emit the first output emission 56a in a first color while the second photoluminescent layer 60b may remain inactive. The second photoluminescent layer 60b may have a second absorption range configured to become excited in response to receiving the second excitation emission 52b. In response to receiving the second excitation emission 52b, the second photoluminescent layer 60b may emit the second output emission 56b in the second color different from the first color.

The second absorption range may comprise a range of wavelengths of light significantly different from the first absorption range such that the first absorption range and the second absorption range do not significantly overlap. In this way, the controller of the lighting module 26 may selectively activate each of the light sources 50 to independently activate the first output emission 56a and the second output emission 56b. The photoluminescent layers 60 are described separately as a first photoluminescent layer 60a and a second photoluminescent layer 60b for clarity. However, it shall be understood that the materials of the photoluminescent layers 60 may be combined in a single layer, a composite layer, and/or a plurality of layers while maintaining the operating characteristics described herein.

The first light source 50a and the second light source 50b may be implemented by a variety of lighting devices configured to emit the wavelengths of light of the first excitation emission 52a and the second excitation emission 52b. Light sources that may be implemented may include, but are not limited to, light emitting diodes (LEDs), high-intensity LEDs, superluminescent LEDs, laser diodes, and/or the like. In this configuration, the light sources 50 may be configured such that the first excitation emission 52a comprises wavelengths of light in a first absorption range of the first photoluminescent portion 60a, and the second excitation emission 52b comprises wavelengths of light in a second absorption range of the second photoluminescent portion 60b. In this configuration, the controller of the lighting apparatus 12 may control the first light source 50a and the second light source 50b to independently illuminate each of the lighting modules 26 with the first output emission 56a, the second output emission 56b, and any combination thereof.

Figure 4A:
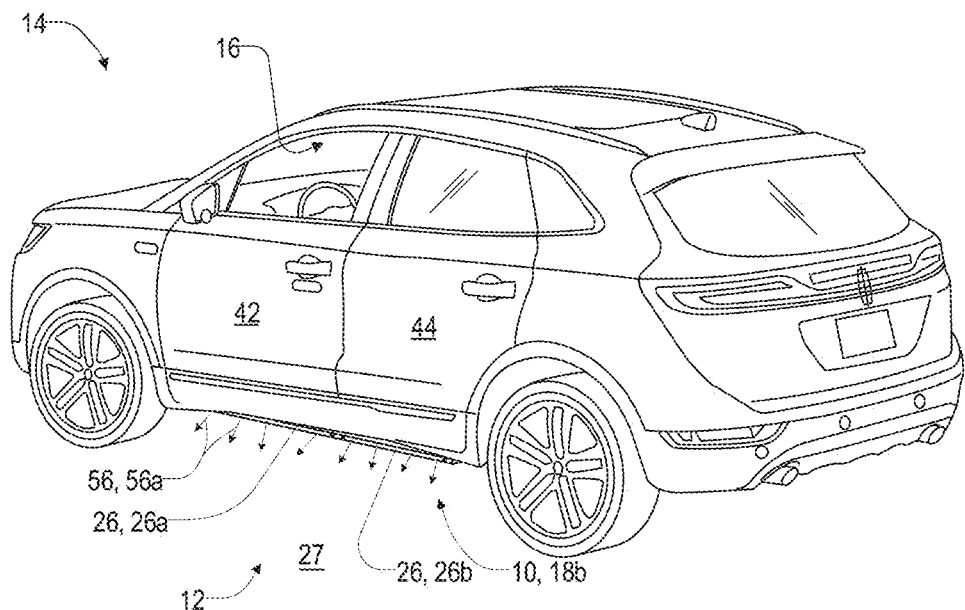
FIG. 4A is a projected view of a vehicle comprising an illuminated running board in a first configuration.
Figure 4B:
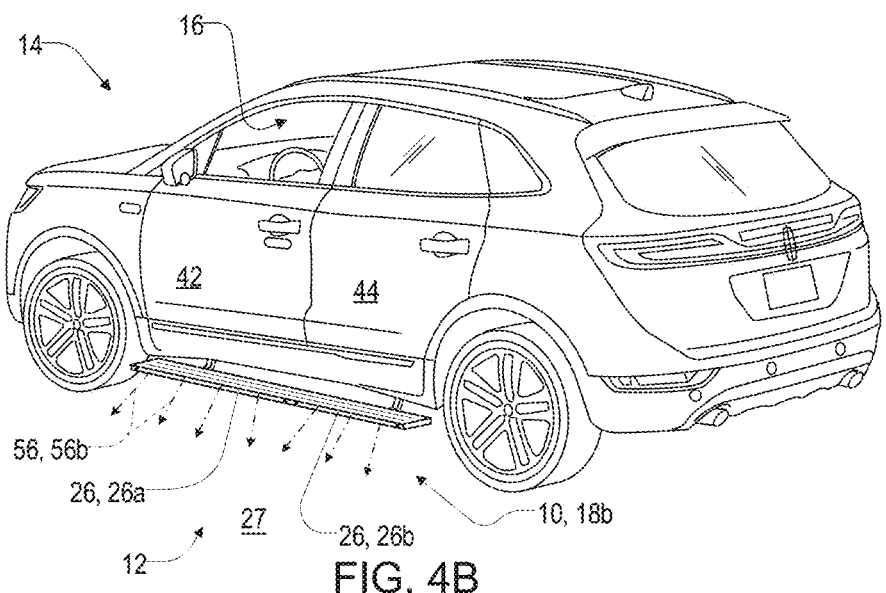
FIG. 4B is a projected view of a vehicle comprising an illuminated running board in a second configuration.
Figure 4C:
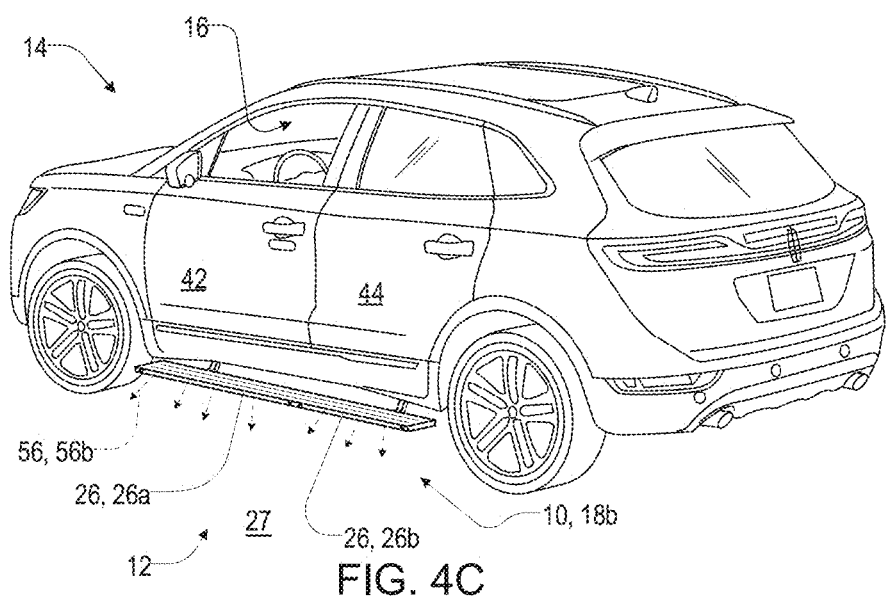
FIG. 4C is a projected view of a vehicle comprising an illuminated running board in a third configuration.

Referring now to FIGS. 4A, 4B, and 4C, a plurality of configurations of the vehicle 14 are shown demonstrating a method of operation of the system 20. As previously discussed, the system 20 may comprise the running board apparatus 10 and the lighting apparatus 12. As shown in FIG. 4A, the vehicle 14 is demonstrated with the running board 10 arranged in the retracted configuration 18b, the controller may selectively activate each of the light sources 50a and 50b to emit the first output emission 56a and/or the second output emission 56b from an underbody region substantially beneath the vehicle 14. In some embodiments, the retracted configuration 18b may be implemented while the vehicle 14 is operated in a driving configuration.

In some implementations, the controller may control one or more of the lighting modules 26 to illuminate a surface proximate to the vehicle 14 and/or activate to output an operating indicator (e.g. turn signal, hazard indication, cornering light, etc.). For example, the controller may selectively activate the first light source 50a to activate the first output emission 56a for a prolonged duration throughout operation. Additionally, the controller may be configured to independently activate the second light source to activate the second output emission 56b to output a short transient illumination that is not sustained for more than a few seconds. In this way, the controller may control the lighting modules 26 of the lighting apparatus 12 to suit a variety of applications.

In some embodiments, the controller may control the operation of the lighting modules 26 to illuminate in a parked configuration. For example, in some embodiments, the controller may be configured to periodically activate the first light source 50a to charge the persistent luminescent material of the first photoluminescent layer 60a. The periodic activation of the first light source 50a may be activated at a frequency commensurate to the charge period of the first photoluminescent layer 60a. For materials configured to store a charge for a longer duration, the controller may be configured to activate the first light source at a decreased frequency and an increased frequency for materials configured to store a charge for a lower duration. In this way, the controller may preserve the energy of a battery of storage device of the vehicle 14 by only activating the first light source 50a for a portion of the time when the output emission 56a is output from the running board 10.

Referring now to FIGS. 4B and 4C, the vehicle 14 is shown with the running board apparatus 10 configured in a deployed configuration 18a. As previously discussed in reference to the FIG. 4A, the controller may selectively activate the first light source 50a and/or the second light source 50b in combination to selectively activate the first output emission 56a and/or the second output emission 56b. In some implementations, the controller may be configured to control the motor 34 to deploy the deck 28 of the running board apparatus 10 from the retracted configuration 18b to the deployed configuration 18a. In response to the running board apparatus 10 reaching the deployed configuration 18a, the controller may activate the second light source 50a at a first intensity indicating that the deck 28 is fully extended and ready for passengers. Following the activation of the second output emission 56b at the first intensity for a predetermined period of time, the controller may decrease the first intensity of the second light source 50b to a second intensity and maintain the second intensity while the running board is arranged in the deployed configuration 18a. The first intensity is demonstrated as being greater than the second intensity in FIGS. 4B and 4C by a difference in magnitude of the arrows representing the second output emission 56b.

In some embodiments, the vehicle 14 may be implemented in a ride-share or taxi-related application. In such implementations, the controller may selectively illuminate one or more of the first lighting module 26a and the second light module 26b on either side of the vehicle 14 to indicate a corresponding entry door 42, 44. For example, the controller may be configured to illuminate the first lighting module 26a to visually instruct a passenger to enter the vehicle 14 via the corresponding first front entry door 42. Similarly, the controller may be configured to illuminate the second lighting module 26b to visually instruct a passenger to enter the vehicle 14 via the corresponding first rear entry door 44. As previously discussed, the entry doors may be implemented in a variety of configurations and quantities and may include a third lighting module and fourth lighting module similarly implemented below and proximate to a second front entry door and a second rear entry door disposed on an opposite side of the vehicle 14. In this configuration, the controller of the system 20 may selectively activate each of the lighting modules 26 to indicate an entry door 42, 44 of the vehicle 14 that is available for occupancy. Additionally, to determine the occupancy availability of each portion of the passenger compartment 16, the controller may be in communication with one or more monitoring systems (e.g. seat weight sensors, video detect systems, presence or proximity detectors, etc.). The monitoring systems may be configured to detect the occupancy of each seat of the vehicle 14 in relation to the entry doors 42, 44. Further details of an exemplary controller of the system 20 are discussed in reference to FIG. 6.

Figure 5:
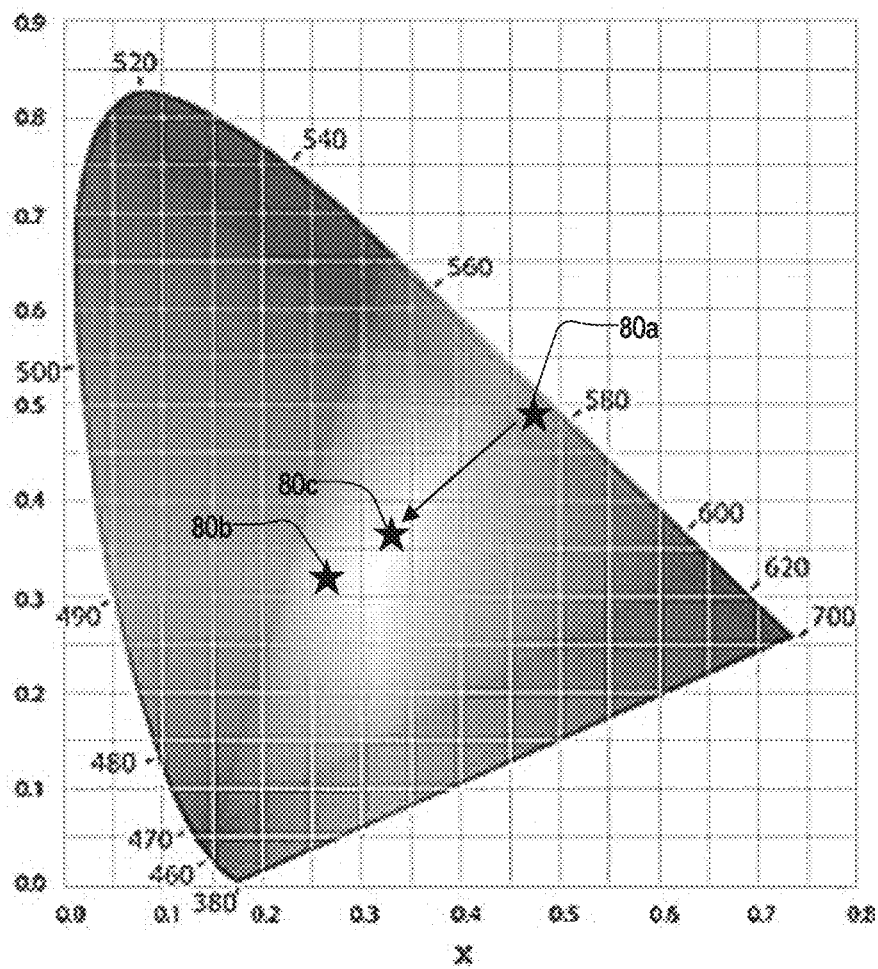
FIG. 5 is a color space diagram demonstrating a color shift of an output emission of a lighting apparatus.

Referring now to FIG. 5, in some implementations, the lighting modules 26 may be illuminated in a first color 80a generated by the first photoluminescent layer 60a and a second color 80b generated by the second photoluminescent layer 60b. The first color 80a may be generated in an amber or orange color by the long persistence phosphor material in response to receiving the first excitation emission 52a as wavelengths of light in a first absorption range of approximately 360-380 nm in wavelengths. The second color 80b may be generated as a bluish white color by a fluorescent dye or phosphor material that does not persist to illuminate following the deactivation of the second excitation emission 52b. The second color 80b may be generated in response to receiving the second excitation emission 52b in a second absorption range of approximately 460-480 nm in wavelength. In this configuration, the controller may be configured to selectively illuminate the first photoluminescent material 60a independent of the activation of the second photoluminescent material 60b due to the difference in the first absorption range and the second absorption range.

As previously discussed, each of the light sources 50a and 50b may be configured to emit the excitation emissions 52a, 52b at varying levels of intensity. Accordingly, in some instances, the controller may activate the first light source 50a to emit the first excitation emission 52a at a high intensity. The controller may be configured to activate the first excitation emission 52a at a high intensity to output warning or signaling notifications, such as a turn signal, hazard indication, cornering light, etc. The controller may also be configured to output the first excitation emission 52a as a low-intensity light, which may be well suited to illuminating the lighting modules 26 in a low ambient light that may be activated as a parking light that may remain active for extended periods after the first excitation emission 52a is deactivated.

The second light source 50b may be configured to illuminate the second photoluminescent layer 60b at a variety of intensities. As previously discussed, the controller may control the second light source 50b to illuminate the lighting module at a high intensity in response to the running board 10 extending to the deployed configuration 18a (see FIG. 4B). Following the deployment of the running board 10, the controller may continue to illuminate the lighting module 26 by controlling the second light source 50b to illuminate the lighting module 26 at a medium intensity, lower than the high intensity. In this way, the controller may be configured to control the system 20 to emit the second output emission 56b at a high intensity indicating the deployed configuration 18a and maintain the second output emission 56 at a decreased level to illuminate the running board 10 for entry into the vehicle 14.

Still referring to FIG. 5, the controller may be configured to activate the first light source 50a and the second light source 50b at the same time. The result of the combined illumination may result in a third output emission in a third color 80c resulting from the combination of the first output emission 56a and the second output emission 56b. The third color 80c may correspond to a bright white light resulting from a combination of the amber of the first color 80a and the bluish white of the second color 80b. Accordingly, the lighting apparatus 12 may be configured to selectively illuminate each of the lighting modules 26 in each of the first color 80a, the second color 80b, and/or a third color 80c to suit a variety of lighting applications.

Figure 6:
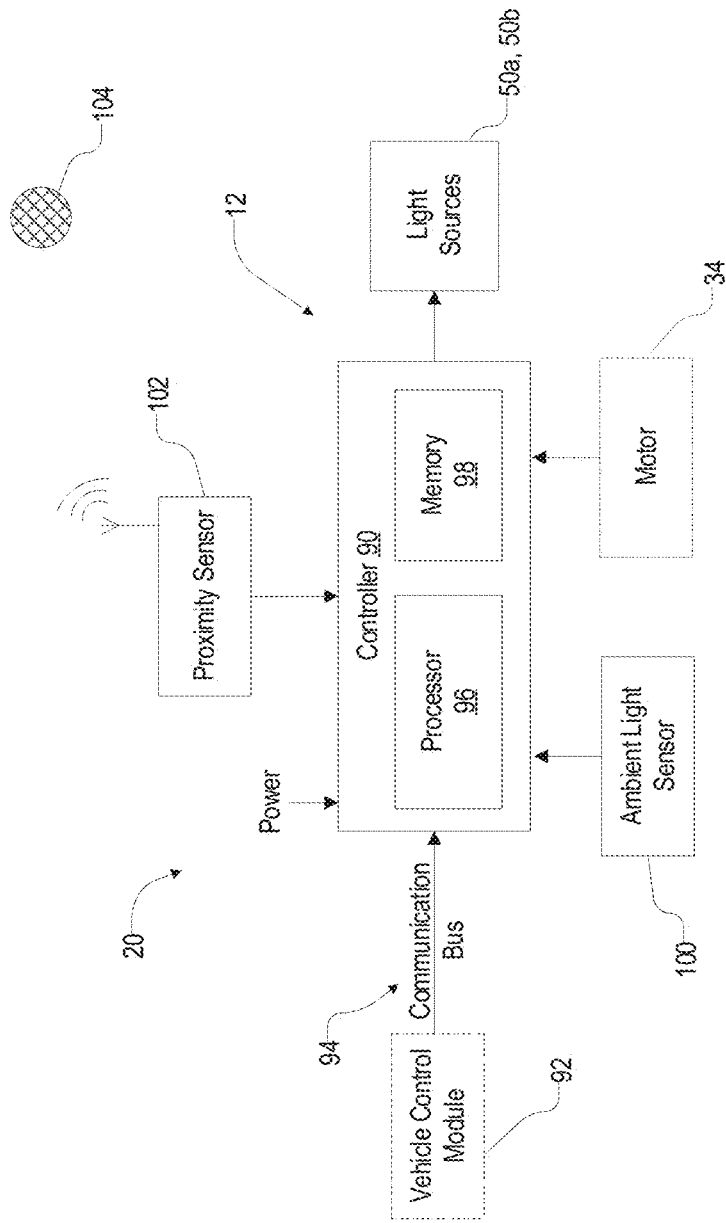
FIG. 6 is a block diagram of a lighting apparatus and related system configured to control the illumination of a running board apparatus in accordance with the disclosure.

Referring now to FIG. 6, a block diagram of the system 20 comprising the running board apparatus 10 and the lighting apparatus 12 is shown. As previously discussed, the system 20 may comprise a controller 90 in communication with each of the lighting modules 26 and the motors 34 of the running boards. Additionally, the controller 90 may be in communication with a vehicle control module 92 via a communication bus 94 of the vehicle 14. The communication bus 94 may be configured to deliver signals to the controller 90 identifying various vehicle states. For example, the communication bus 94 may be configured to communicate to the controller 90 a drive selection of the vehicle, an ignition state, a door open or ajar status, a remote activation of the lighting apparatus 12, or any other information or control signals that may be utilized to activate or adjust the output emissions 56.

The controller 90 may comprise a processor 96 having one or more circuits configured to receive the signals from the communication bus 94 and output signals to control the lighting apparatus 12 to emit the output emissions 56. The processor 96 may be in communication with a memory 98 configured to store instructions to control the activation of the lighting apparatus 12. The controller 90 may further be in communication with an ambient light sensor 100. The ambient light sensor 100 may be operable to communicate a light condition, for example, a level of brightness or intensity of the ambient light proximate the vehicle 14. In response to the level of the ambient light, the controller 90 may be configured to adjust a light intensity output from the lighting apparatus 12. The intensity of the light output from the lighting apparatus 12 may be adjusted by controlling a duty cycle, current, or voltage supplied to the lighting apparatus 12.

The controller 90 may further be in communication with a proximity sensor 102. In various implementations, the proximity sensor 102 may correspond to various components that may be in communication with the controller 90. For example, the proximity sensor 102 may correspond to a Bluetooth sensor in communication with a mobile device, a cell phone signal detection device, a radar proximity system (e.g. blind spot warning and/or lane departure signal), and ultrasonic proximity detector (e.g. parking sensors on various portions of the exterior of the vehicle 14), cameras or imager (e.g. 360 degree surveillance or autonomous operation cameras, and driver assist cameras (e.g. backup cameras, blind spot cameras, forward-directed cameras, etc.). Additionally, the proximity sensor 102 may correspond to a capacitive sensor, which may be disposed proximate a window, bumper, and various panels or trim of the vehicle, electromagnetic sensors, laser sensors, and/or radar systems, which may be utilized in adaptive cruise control and/or driver assist systems. The proximity sensor 102 may also correspond to at least one infrared sensor, which may be utilized in a lane departure or blind spot warning system.

In the various configurations discussed herein, the proximity sensor 102 may be in communication with the controller 90 and operable to detect an approaching passenger of the vehicle 14. In some implementations, the proximity sensor 102 may be operable to identify a particular person or group of persons as detected by the proximity sensor 102. In such implementations, the controller 90 may utilize the proximity sensor 102 to identify a signature or signal of a mobile device 104.

The mobile device 104 may correspond to a fob, key, cellular phone, etc. (e.g. a device having a radio frequency signature) detected proximate the vehicle 14. In this way, the controller 90 may detect a specific person or person belonging to a group based on the radio frequency signal and activate a lighting operation in response to the detection. By identifying different groups of people affiliated with the vehicle 14 or a manufacturer of the vehicle 14, the controller 90 may be operable to control the lighting operation of the illumination apparatus to emit light in a different timing, pattern, color, etc. based on a specific group or person approaching or departing from the vehicle 14.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination system for a vehicle running board apparatus comprising:
   at least one lighting module in connection with a step portion of the running board, the lighting module extending longitudinally along the running board proximate to a plurality of doors of the vehicle, wherein the at least one lighting module comprises a plurality of lighting modules positioned in the running board below each of the plurality of doors and a waveguide forming an emission surface extending longitudinally along a side portion of the step portion; and
a controller in communication with at least one occupancy sensor, the controller configured to:
identify a location in the passenger compartment available for occupancy in response to information communicated from the occupancy sensor; and
illuminate each of the lighting modules to indicate a selected door of the plurality of doors, wherein the selected door corresponds to the location in the passenger compartment available for occupancy.

2. The illumination system according to claim 1, wherein the occupancy sensor comprises at least one of a seat weight sensor, a video detection system, a presence sensor, and a proximity detector.

3. The illumination system according to claim 1, wherein the occupancy sensor is configured to detect the occupancy of a plurality of seat of the vehicle in relation to the plurality of doors.

4. A method for identifying a location in a passenger compartment available for occupancy of a vehicle comprising a plurality of doors and a running board, the method comprising:

detecting an occupancy of each of a plurality of seats in the vehicle;
identifying at least one location in the passenger compartment of the vehicle available for seating in response to the detection of the occupancy;
identifying an entry door of the plurality of doors of the vehicle, wherein the entry door is one of the plurality of doors corresponding to the location in the passenger compartment of the vehicle available for seating; and
illuminating one of a plurality of lighting modules identifying the entry door, wherein the lighting modules are disposed in portions of the running board proximate to each of the plurality of doors, wherein the illumination of the one of the plurality of lighting modules provides a visual indication of the entry door providing access to the location available for seating and the light emitted from the plurality of lighting modules is output through a waveguide extending longitudinally along a side portion of the running board.

5. The method according to claim 4, wherein the occupancy of each of the plurality of seats is identified by monitoring at least one of a seat weight sensor, a video sensor, a presence sensor, and a proximity detectors.

* * * * *